UNITED STATES PATENT OFFICE.

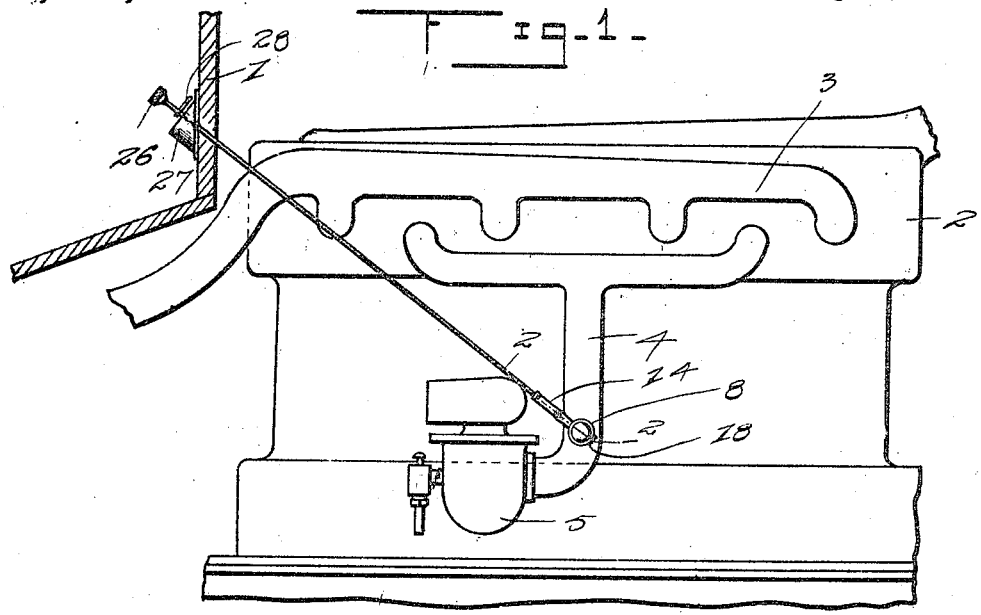
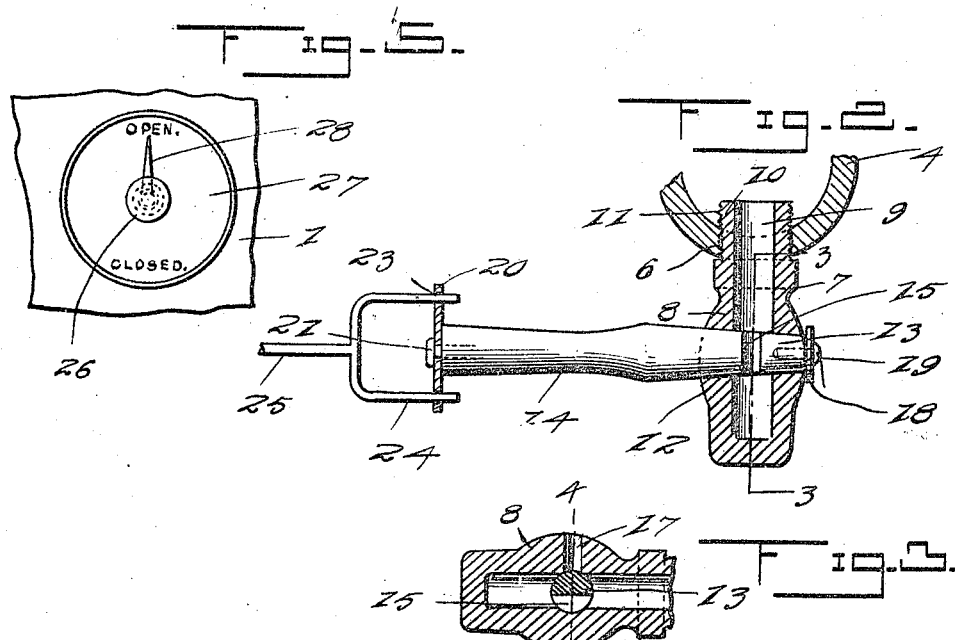
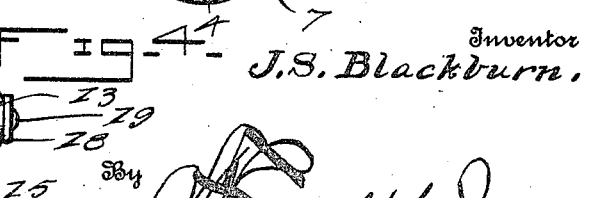

JOHN S. BLACKBURN, OF FLORENCE, SOUTH CAROLINA.

VAPORIZING-VALVE FOR INTERNAL-COMBUSTION ENGINES.

1,237,744.   Specification of Letters Patent.   Patented Aug. 21, 1917.

Application filed September 9, 1916. Serial No. 119,261.

*To all whom it may concern:*

Be it known that I, JOHN S. BLACKBURN, a citizen of the United States, residing at Florence, in the county of Florence and State of South Carolina, have invented certain new and useful Improvements in Vaporizing-Valves for Internal-Combustion Engines; and I do hereby declare the following to be a full, clear, and exact description of the invention, such as will enable others skilled in the art to which it appertains to make and use the same.

This invention relates to improvements in air inlet valves or vaporizing valves for internal combustion engines.

An object of this invention is to provide an inlet valve of this character which may be readily and quickly attached to the inlet manifold pipe of an internal combustion engine, which permits air to be introduced into the manifold to combine with the mixture therein and thereby increase the power and reduce the amount of gasolene required.

A further object of this invention is to provide a valve which may be easily and quickly attached to the inlet manifold pipe and provided with means whereby the valve may be closed to prevent the air entering into the inlet manifold pipe into the mixture therein.

A further object of the invention is to provide a valve having a body, a valve stem rotatably mounted transversely in the body intermediate the ends thereof, and provided with an opening, which permits the pressure of air from the engine to be equally distributed on opposite sides of the inner end of the stem thereof so that the rotation of the stem may easily be accomplished.

With these and other objects in view, the invention consists in the novel combination, and arrangement of parts hereinafter more fully described and pointed out in the claim hereto appended.

In the drawings:

Figure 1 is a side elevation of an engine equipped with an air inlet valve constructed in accordance with my invention, Fig. 2 is a sectional view taken on the line 2—2 of Fig. 1, Fig. 3 is a sectional view taken on the line 3—3 of Fig. 2, Fig. 4 is a sectional view taken on the line 4—4 of Fig. 3, and Fig. 5 is a top plan view of the operating rod.

Like numerals of reference designate corresponding parts in all the figures of the drawings.

Referring more particularly to the drawings, the numeral 1 designates the dash board of an automobile of the usual type, 2 designates the engine having the exhaust manifold 3, and inlet manifold pipe 4, having the usual carbureter 5 attached at its lower end.

In applying my improved air inlet valve to an internal combustion engine, the inlet manifold pipe 4 is provided with an internally screw threaded opening 6, which is adapted to receive the reduced screw thread ed end of my improved valve 7.

My improved valve 7 comprises in its construction the cylindrical body 8, which has an inwardly extending bore 9. The lower open end of my valve is reduced as at 10 and provided with screw threads 11 adapted to be fitted in the screw threads 6 of the opening in the intake manifold 4 of an internal combustion engine. The body of the valve 8 is provided intermediate its ends with the valve stem receiving opening 2, which openings are located at diametrically opposite points and in direct alinement with each other and are adapted to receive the reduced end 13 of the valve stem 14.

The valve 14 is cylindrical in cross section and has one end reduced as at 13, and is provided with a transverse slot on one face as at 15, which slot is adapted to open the communication and aline with the opening 17, in the body 8. The opening 17 is an air inlet opening and communicates at its inner end with the bore 9 of the valve body. The stem 14 is held against removal by a washer 18 and a screw or other suitable fastening means 19.

The opposite end of the stem has secured thereto a plate 20, which is secured intermediate its ends to the free end of the stem 14 by a bolt or other suitable fastening means 21. The plate 20 is provided near each end with an opening 23 in which are adapted to be secured the arms 24 of the operating rod 25, which rod extends upwardly through the dash board 1 of the automobile and is provided with a casing 26 which has its outer side fully open in which is seated a disk 27 and which has the words "Open" and "Closed" printed thereon, the outer end of the rod is provided with an arrow or marking point 28, which is adapted to be turned or rotated by the operator of the machine, opening or closing the valve 8 by the rotational movement of the stem 14.

When the valve stem 14 is turned to close the inlet opening 17, its passage 16 is in parallel relation with the bore 9 of the body, thereby permitting the pressure to be evenly distributed on each side so that the rotation of the valve stem will be assured.

In operation:

When assembling my valve the screw threads 11 of the body 8 are fitted into the inlet opening 6 of the inlet manifold pipe and the stem 14 is extended horizontally through the body of the valve and is secured therein for rotational movement and the rod 25 is secured in the plate 20, and its upper end arranged to extend through the dash board 1 and has its upper end carrying a pointer 28 which is arranged for rotational movement over the disk 27 carried by the casing 26 and upon which are the words "Open" and "Closed" so that the operator of the machine will know whether the valve 8 is in open or closed position, so that air can be sucked in through the inlet port 17 into the inlet manifold.

It is understood that the length of the bore 9 is such as to permit the easy distributing of the pressure from the engine on opposite sides of the valve stem 14 so that the same may be easily and quickly rotated.

What is claimed is:

A vaporizing valve for internal combustion engines comprising a cylindrical body having an inwardly extending bore and an air inlet formed in the body and communicating with the bore centrally thereof, the open end of the valve being reduced and provided with exterior screw-threads to removably secure the valve in a screwthreaded opening in the intake manifold of an engine, said valve provided adjacent its closed end with a pair of alined transverse openings, which are located at diametrically opposite points, a valve stem cylindrical in cross section having one end reduced and arranged in the transverse openings and removably secured therein, the inner end of the valve provided with a transverse slot adapted to aline with the bore of the valve body to establish communication between the engine and valve, said location of the stem in the valve body permitting the pressure of the engine to be equally distributed on opposite sides thereof to permit an easy rotational movement of the valve stem when in use, a disk secured to the free end of the valve stem, a rod secured to the disk turning the valve stem to open and close the valve.

In testimony whereof I affix my signature in presence of two witnesses.

JOHN S. BLACKBURN

Witnesses:
  C. S. BRISTOW,
  CHAS. E. EARLY.